United States Patent
Yoshida et al.

(10) Patent No.: US 10,583,670 B2
(45) Date of Patent: *Mar. 10, 2020

(54) METHOD FOR DISPLAYING OBJECTS BASED ON DISPLAY RESOLUTION, INFORMATION PROCESSING APPARATUS FOR IMPLEMENTING METHOD, AND COMPUTER-READABLE MEDIUM STORING INSTRUCTIONS THEREFOR

(71) Applicant: Brother Kogyo Kabushiki Kaisha, Nagoya-shi, Aichi-ken (JP)

(72) Inventors: Junjiro Yoshida, Nagoya (JP); Hideaki Ueda, Nagoya (JP); Tetsuya Nose, Nagoya (JP); Yongqi Sun, Tokyo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,316

(22) Filed: Jul. 26, 2019

(65) Prior Publication Data

US 2019/0344585 A1 Nov. 14, 2019

Related U.S. Application Data

(63) Continuation of application No. 16/021,607, filed on Jun. 28, 2018, now Pat. No. 10,406,827.

(30) Foreign Application Priority Data

Sep. 15, 2017 (JP) .................................. 2017-178132

(51) Int. Cl.
*G06K 15/00* (2006.01)
*B41J 3/407* (2006.01)
(Continued)

(52) U.S. Cl.
CPC ............... *B41J 3/4075* (2013.01); *B41J 3/46* (2013.01); *G06F 3/04842* (2013.01); *G06F 3/12* (2013.01);
(Continued)

(58) Field of Classification Search
CPC ....... B41J 3/4075; B41J 3/46; G06F 3/04842; G06K 15/1223; G06K 15/1843; G06K 15/1873; H04N 1/393; H04N 1/3935
See application file for complete search history.

(56) References Cited

U.S. PATENT DOCUMENTS 9,569,705 B2 * 2/2017 Yamada ................ G06F 3/1208
9,940,557 B2 * 4/2018 Chapman ........... G06K 15/1843

FOREIGN PATENT DOCUMENTS

JP 2014-071584 A 4/2014

* cited by examiner

*Primary Examiner* — Kent Yip
(74) *Attorney, Agent, or Firm* — Banner & Witcoff, Ltd.

(57) ABSTRACT

A non-transitory computer-readable medium for an information processing apparatus stores instructions realizing a controlling program. The controlling program causes, when executed, a controller to obtain rendering information corresponding to a rendering event when a rendering event requiring input of the rendering command to the operating system is generated, obtain characteristic information regarding a resolution of the display, and generate the raster image data using the rendering information as obtained and an expansion rendering instruction information as input. The instructions cause, when executed, the controller to input reduced display instruction information in the operating system, the reduced display instruction being information instructing the operating system to display an image represented by the raster image data rendered in the rendering area at a first conversion ratio representing a ratio of a (Continued)

resolution of a display with respect to a particular resolution when the operating system executes the display process.

9 Claims, 7 Drawing Sheets

(51) Int. Cl.
| | |
|---|---|
| *B41J 3/46* | (2006.01) |
| *G06F 3/0484* | (2013.01) |
| *G06F 17/21* | (2006.01) |
| *G06F 17/24* | (2006.01) |
| *G06F 3/12* | (2006.01) |

(52) U.S. Cl.
CPC .......... *G06F 17/211* (2013.01); *G06F 17/214* (2013.01); *G06F 17/24* (2013.01)

BEFORE ADJUSTMENT

AFTER ADJUSTMENT

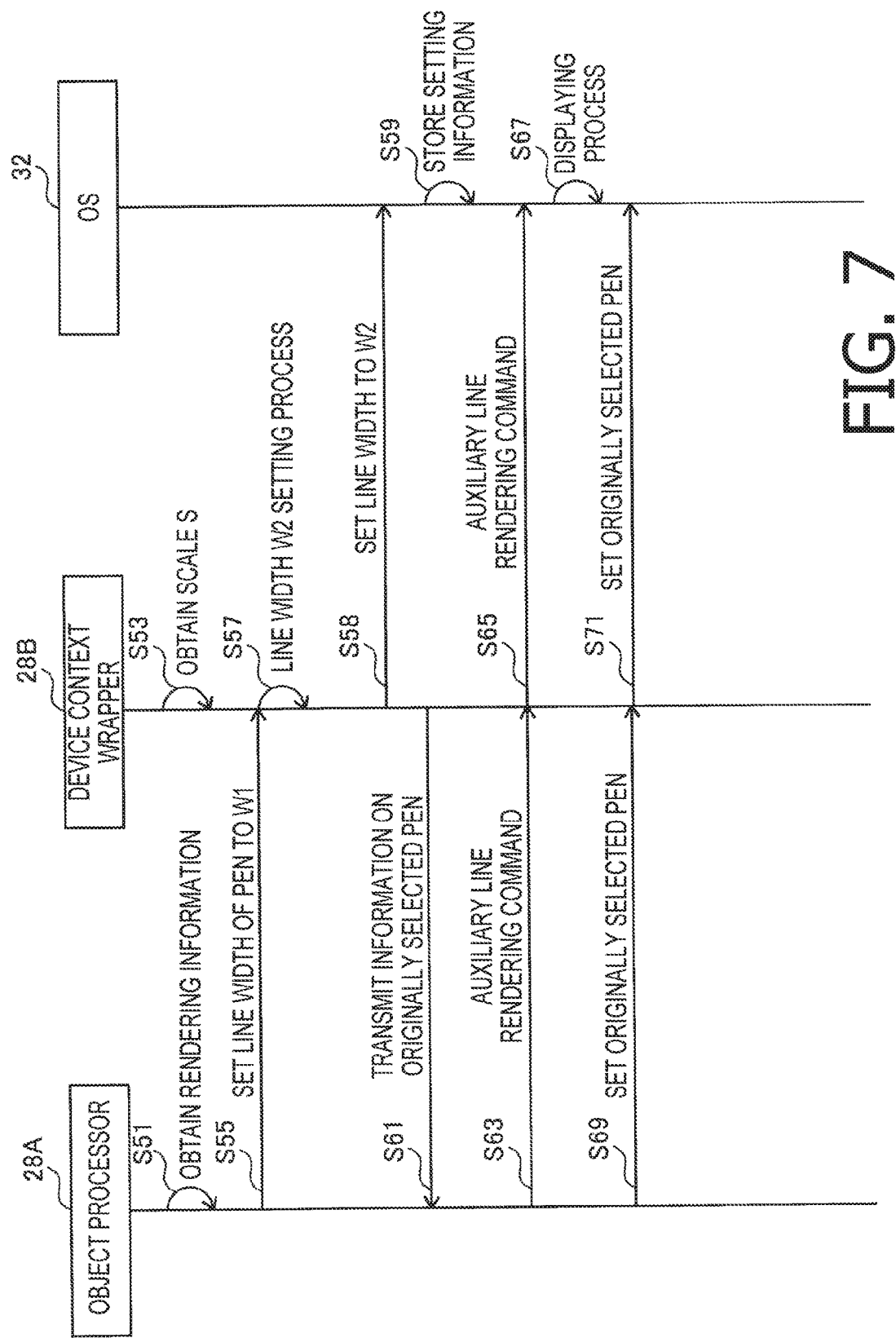

METHOD FOR DISPLAYING OBJECTS BASED ON DISPLAY RESOLUTION, INFORMATION PROCESSING APPARATUS FOR IMPLEMENTING METHOD, AND COMPUTER-READABLE MEDIUM STORING INSTRUCTIONS THEREFOR

CROSS-REFERENCE TO RELATED APPLICATIONS

This application is a continuation of U.S. application Ser. No. 16/021,607, filed Jun. 28, 2018, which application claims priority under 35 U.S.C. § 119 from Japanese Patent Application No. 2017-178132 filed on Sep. 15, 2017. The entire subject matter of the application is incorporated herein by reference.

BACKGROUND

Technical Field

The present disclosures relate to a non-transitory computer-readable medium containing instructions which cause a computer to control an information processing apparatus configured to create an image including objects.

Related Art

There has been known a technique of creating labels by operating a terminal connected to a label printer. Typically, the terminal is operated by an operator and create a template including printing objects in accordance with an editing operation by the operator.

SUMMARY

In association with a technological development of displays, high-resolution displays having twice or thrice the number of dots of a conventional display have been developed recently. When an object such as letters, characters or lines are to be displayed on such a high resolution display when, for example, a template for a label, if data of the objects is not compliant to the high-resolution display, a performance of the display cannot be sufficiently utilized such that, for example an outline of an object cannot be displayed smoothly. Thus, it is desirable that a displaying process is performed in accordance with the resolution of the display.

According to aspects of the present disclosures, there is provided a non-transitory computer-readable medium for an information processing apparatus having a display, a memory and a controller, the display having a plurality of display pixels, an operating system being installed in the information processing apparatus, the non-transitory computer readable medium storing instructions realizing a controlling program, wherein, when a rendering command is received by the operating system from a program installed in the information processing apparatus, the operating system is capable of performing a rendering process of rendering raster image data in a rendering area secured in the memory in accordance with the received rendering command, the raster image data having a plurality of pieces of pixel data, each of the plurality of piece of pixel data is image data for a unit of a pixel, wherein the operating system causes, when executed, the controller to perform a display process to display an image represented by the raster image data rendered in the rendering area by controlling the plurality of display pixels based on the raster image data rendered in the rendering area of the memory. The controlling program causes, when executed, the controller to perform, when a rendering event requiring input of the rendering command to the operating system is generated, a rendering information obtaining process to obtain rendering information corresponding to the rendering event, and a raster image data generating process to generate the raster image data using the rendering information as obtained and expansion rendering instruction information as input, wherein the expansion rendering instruction information is information instructing the controller to generate the raster image data by expanding the raster image data indicated by the rendering information when the raster image data is generated at a first conversion ratio, the first conversion ratio being a conversion ratio corresponding to the characteristic information obtained in a characteristic information obtaining process, the characteristic information obtaining process being a process to obtain character information regarding a resolution of the display, wherein the first conversion ratio is a conversion ratio assuming a size of non-expanded raster image data as one, the non-expanded raster image data being the raster image data generated in the raster image data generating process when using the rendering information as an input without including the expansion rendering instruction information. Further, the instructions cause, when executed, the controller to perform a first input process of inputting reduced display instruction information in the operating system, the reduced display instruction being information instructing the operating system to display an image represented by the raster image data rendered in the rendering area at the first conversion ratio when the operating system executes the display process.

According to aspects of the present disclosures, there is provided a non-transitory computer-readable medium for an information processing apparatus having a display, a memory and a controller, the display having a plurality of display pixels, an operating system being installed in the information processing apparatus, the non-transitory computer readable medium storing instructions realizing a controlling program. When a rendering command is received from a program installed in the information processing apparatus, the operating system is capable of performing a rendering process of rendering raster image data in a rendering area secured in the memory in accordance with the received rendering command, the raster image data having a plurality of pieces of pixel data, each of the plurality of piece of pixel data is image data for a unit of a pixel. The operating system causes, when executed, the controller to perform a display process to display an image represented by the raster image data rendered in the rendering area by controlling the plurality of display pixels based on the raster image data rendered in the rendering area of the memory. The controlling program causes, when executed, the controller to perform a rendering information obtaining process to obtain rendering information corresponding to the rendering event when a rendering event requiring input of the rendering command to the operating system is generated, a characteristic information obtaining process to obtain character information regarding a resolution of the display; and a first inputting process to input a first rendering command including the rendering information obtained in the rendering information obtaining process and a line width designating information, the rendering information instructing rendering of image data indicating a line, the line width designating information instructing a first line width of the line instructed by the rendering instruction to a second line width, the second line width identifying a thinner line width than the first line width based on the characteristic information.

According to aspects of the present disclosures, there is provided a method of controlling an information processing apparatus having a display and a memory, the display having a plurality of display pixels, an operating system being installed in the information processing apparatus, wherein, when a rendering command is received by the operating system from a program installed in the information processing apparatus, the operating system is capable of performing a rendering process of rendering raster image data in a rendering area secured in the memory in accordance with the received rendering command, the raster image data having a plurality of pieces of pixel data, each of the plurality of piece of pixel data being image data for a unit of a pixel, wherein a display process being executed to display an image represented by the raster image data rendered in the rendering area by controlling the plurality of display pixels based on the raster image data rendered in the rendering area of the memory. The method executes a rendering information obtaining process to obtain rendering information corresponding to the rendering event when a rendering event requiring input of the rendering command to the operating system is generated, and a raster image data generating process to generate the raster image data using the rendering information as obtained and expansion rendering instruction information as input, wherein the expansion rendering instruction information is information instructing generation of the raster image data by expanding the raster image data indicated by the rendering information when the raster image data is generated at a first conversion ratio, the first conversion ratio being a conversion ratio corresponding to the characteristic information obtained in a characteristic information obtaining process, the characteristic information obtaining process being a process to obtain character information regarding a resolution of the display, wherein the first conversion ratio is a conversion ratio assuming a size of non-expanded raster image data as one, the non-expanded raster image data being the raster image data generated in the raster image data generating process when using the rendering information as an input without including the expansion rendering instruction information. The method further executes a first input process of inputting reduced display instruction information in the operating system, the reduced display instruction being information instructing the operating system to display an image represented by the raster image data rendered in the rendering area at the first conversion ratio when the operating system executes the display process.

According to aspects of the present disclosures, there is provided an information processing apparatus having a display, a memory and a controller, the display having a plurality of display pixels, an operating system being installed in the information processing apparatus, wherein, when a rendering command is received by the operating system from a program installed in the information processing apparatus, the operating system is capable of performing a rendering process of rendering raster image data in a rendering area secured in the memory in accordance with the received rendering command, the raster image data having a plurality of pieces of pixel data, each of the plurality of piece of pixel data being image data for a unit of a pixel, wherein a display process being executed to display an image represented by the raster image data rendered in the rendering area by controlling the plurality of display pixels based on the raster image data rendered in the rendering area of the memory. The controller is configured to perform a rendering information obtaining process to obtain rendering information corresponding to the rendering event when a rendering event requiring input of the rendering command to the operating system is generated, and a raster image data generating process to generate the raster image data using the rendering information as obtained and expansion rendering instruction information as input, wherein the expansion rendering instruction information is information instructing generation of the raster image data by expanding the raster image data indicated by the rendering information when the raster image data is generated at a first conversion ratio, the first conversion ratio being a conversion ratio corresponding to the characteristic information obtained in a characteristic information obtaining process, the characteristic information obtaining process being a process to obtain character information regarding a resolution of the display, wherein the first conversion ratio is a conversion ratio assuming a size of non-expanded raster image data as one, the non-expanded raster image data being the raster image data generated in the raster image data generating process when using the rendering information as an input without including the expansion rendering instruction information. Further, the controller executes a first input process of inputting reduced display instruction information in the operating system, the reduced display instruction being information instructing the operating system to display an image represented by the raster image data rendered in the rendering area at the first conversion ratio when the operating system executes the display process.

BRIEF DESCRIPTION OF THE ACCOMPANYING DRAWINGS

FIG. 7 is a sequence chart showing a process of displaying an auxiliary line performed by an image data creating module.

EMBODIMENT

<Configuration of Printer System>

Hereinafter, referring to the accompanying drawings, an illustrative embodiment according to aspects of the present disclosures will be described. It is noted that the illustrative embodiment is only an example of an embodiment according to the present disclosures, and various modifications can be made without departing from the aspects of the present disclosures. For example, an order of processes and steps according to the illustrative embodiment, which will be described later, can be changed as far as the aspects of the present disclosures are not changed.

Figure 1:
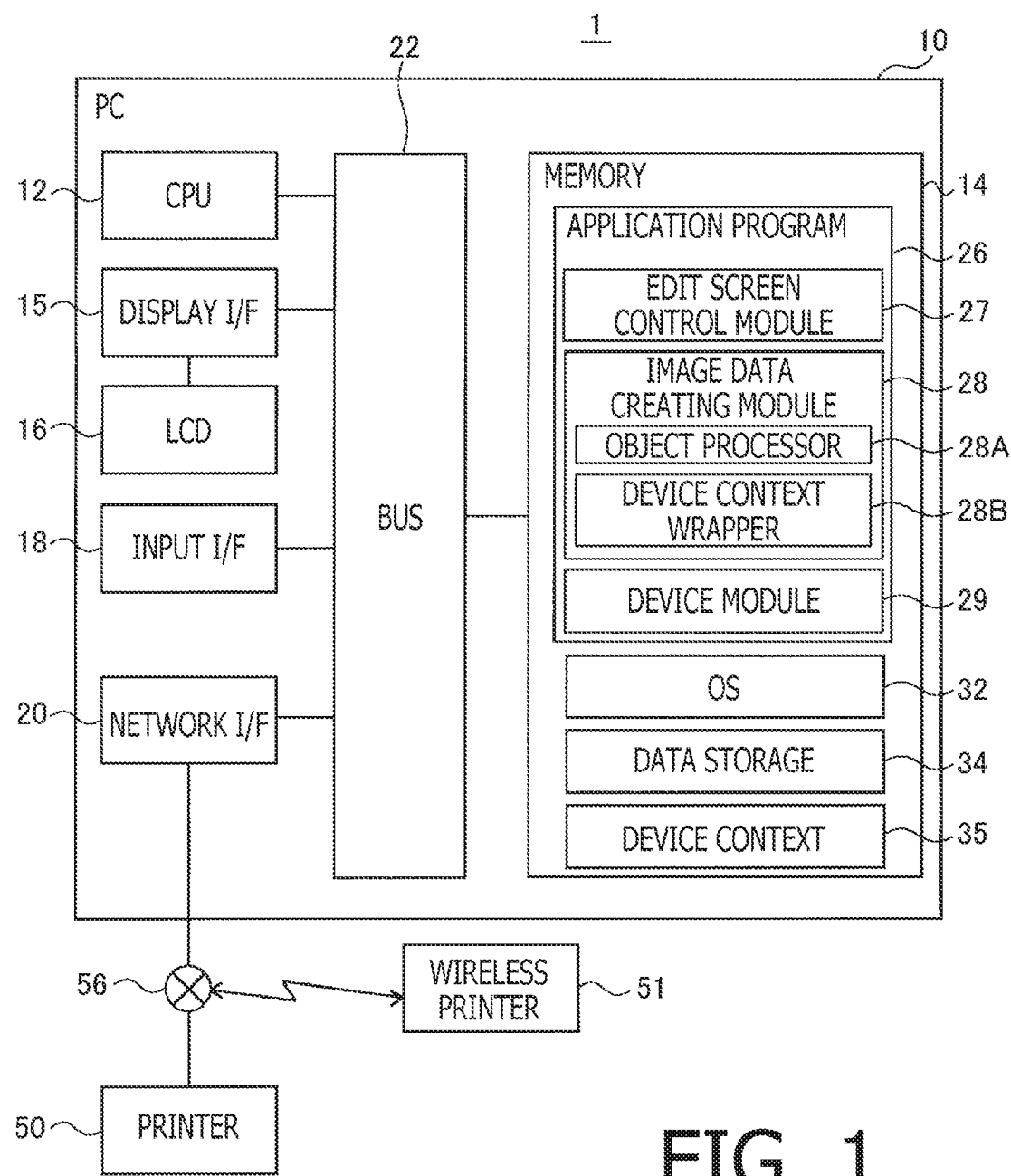
FIG. 1 is a block diagram of a printer system according to an illustrative embodiment of the present disclosures.

The printer system 1 according to the illustrative embodiment shown in FIG. 1 is provided with a PC 10, a printer 50 and a wireless printer 51. The PC 10 mainly has a CPU (an example of a controller) 12, a memory 14, a display I/F (an example of an interface) 15, an LCD (an example of a display) 16, an input I/F (an example of a user interface) 18, and a network I/F 20. The components of the PC 10 mentioned above are interconnected through a bus 22 so as to communicate with each other.

The PC 10 and the printer 50 can perform a wired communication with each other through a network I/F 20 and a network 56. For the wired communication, a LAN cable may be employed, for example. It is noted that, for the wired communication, a USB cable or the like may be employed instead of the LAN cable. Further, the PC 10 and the wireless printer 51 can perform a wireless communication through the network I/F 20 and the network 56. For the wireless communication, a communication method compliant to the Wi-Fi® standard or the Bluetooth® standard may be employed. Further, the network 56 may be LAN (including a wired LAN or a wireless LAN) or a WAN (including the Internet).

The printers 50 and 51 are, for example, label printers configured to transmit/receive various pieces of information and/or instruction signals to create item labels on which desired texts and images are printed, under control of the PC 10. For example, the printers 50 and 51 are configured to create the item labels by printing texts and images on a tape-type medium such as a long laminated film.

The CPU 12 executes operations in accordance with an application program 26 (an example of a control program) and an OS 32. The application program 26 is for editing images and creating labels by printing the edited image with the printers 50 and 51. The application program 26 includes, as processing modules, an edit screen control module 27, an image data creating module 28 and a device control module 29.

It is noted that the application program 26 may not be configured with an aggregation of a plurality of program modules as above, but may be configured as a single program. Further, the application program 26 needs not be limited to a program to print the edited images on the labels. That is, the application program 26 may be a program causing a page printer to print edited images on A4 or A3 size sheet. Furthermore, the application program 26 may be a program instructing a working machine to reproduce the edited images on a surface of a metal, a glass or a wool member. A laser marker is an example of such a working machine. Still further, the application program 26 may be a program instructing a 3D printer or working machine to create a 3D object realizing the edited images.

The OS 32 is a program providing basic functions which are used by the application program 26. The OS 32 is, for example, an operation system such as Windows®, MacOS®, Linux®, Android®, iOS® and the like. In the following description, the CPU 12 executing a program such as the application program 26 may be referred to simply by the name of the program being executed. For example, an expression "the application program 26 performs an operation" may mean "the CPU 12 executing the application program 26 performs an operation" or "the application program 26 causes the CPU 12 to perform an operation."

Figure 2:
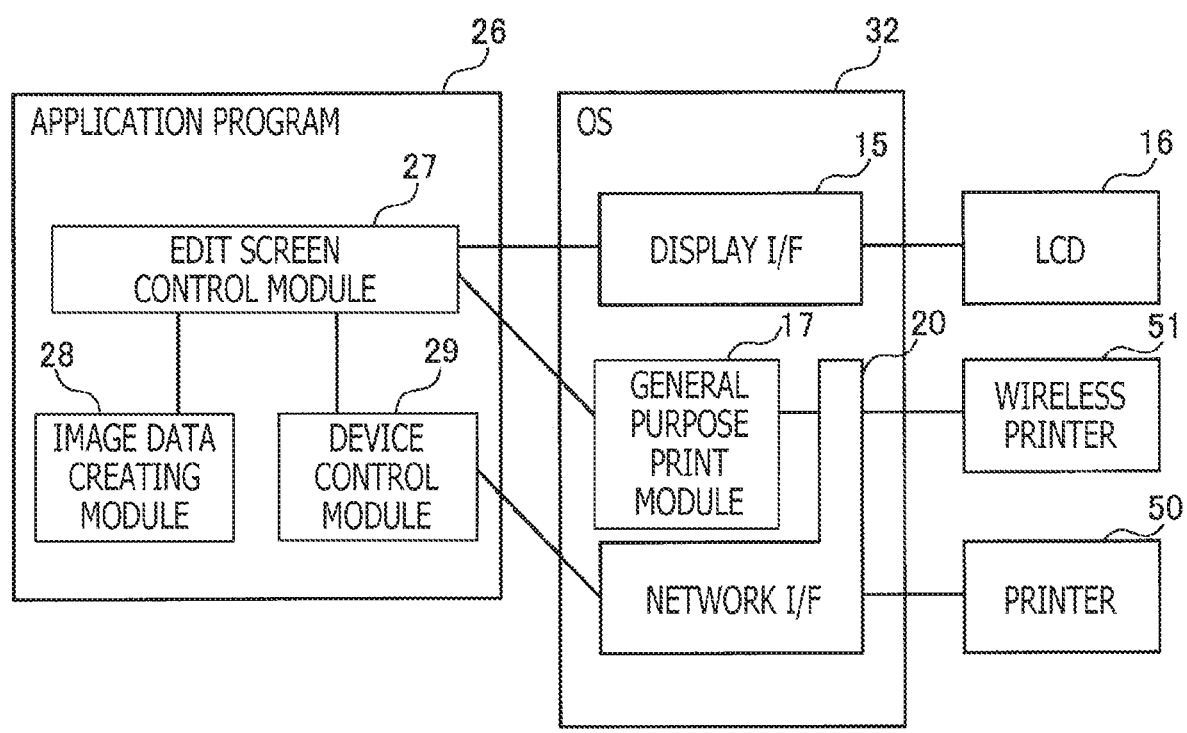
FIG. 2 is a block diagram schematically showing a relationship among programs (including OS and modules) and devices.

FIG. 2 schematically shows a relationship among various programs (program modules) and devices. For example, the edit screen control module 27 is for displaying, on the LCD 16, an edit screen used to create or edit labels. The edit screen control module 27 transmits display instructions to the OS 32 using an API provided by the OS 32, and performs a display process using a displaying program provided by the OS 32. The OS 32 controls the display I/F 15 in accordance with the display instruction output by the edit screen control module 27 to display the edit screen on the LCD 16.

The edit screen control module 27 instructs the image data creating module 28 to create image data indicating an image for displaying an object representing a label subject to edition. Then, the edit screen control module 27 receives the image data created by the image data creating module 28 therefrom, and displays an image based on the received image data on the LCD 16.

The object here means a text, figures (e.g., a circle, a square and the like) and images which configure the label. In response to receipt of an input operation to edit an object from the input I/F 18, the edit screen control module 27 instructs the image data creating module 28 to create image data representing the image for displaying the edited objects on the edit screen. Editing of objects includes addition/deletion of object, change of sizes of objects, changing positions (i.e., relocation) of objects, change of text, change of colors and the like.

The edit screen control module 27 instructs the image data creating module 28 to create image data representing the image of the label edited in the edit screen in order to print the label image with the printer. Then, the edit screen control module 27 receives the image data created by the image data creating module 28 therefrom. Then, the edit screen control module 27 delivers the received image data to the device control module 29 together with a print instruction so that the label is printed by the printer 50 or the printer 51.

It is noted that the edit screen control module 27 causes the wireless printer 51 to print the label by delivering the image data received from the image data creating module 28 and the print instruction to the general purpose print module 17 provided to the OS 32. An example of the general purpose print module 17 is AirPrint® implemented in the MacOS. The general purpose print module 17 transmits the print instruction of the image data received from the edit screen control module 27 to a printer including the printer 50 or 51 compliant to the general purpose print module 17 through the network I/F 20.

The image data creating module 28 is a program which is provided with libraries for creating or editing image data to create a label, and executes creating or editing of the image data. In accordance with an instruction transmitted from the edit screen control module 27, the image data creating module 28 creates the image data for displaying the label on the LCD 16 or the image data for causing the printer 50 or 51 to print the image indicating the label.

The device control module 29 is a program causing the printer 50 to perform printing through the network I/F 20. The device control module 29 causes the printer 50 or 51 to print the image showing the label by, for example, receiving the image data representing the image to be printed by the printer to print the label and the print instruction from the edit screen control module 27, converting the received image data to the print image data used for printing in accordance with the received print instruction, and transmitting the converted print image data to the printer 50 or 51.

The memory 14 has a data storage area 34, which is for storing data necessary for execution of the application program 26. According to the illustrative embodiment, the memory 14 is configured by one of, some of, or all of a combination of a RAM, ROM, a flash memory, an HDD, a portable storage medium such as a USB memory attached to the PC 10, and a buffer provided to the CPU 12.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

Further, the memory 14 includes a device context 35. The device context 35 is an area secured by the OS 32 in the memory 14, and serves as a storage area for rendering. The OS 32 may secure the device context 35 in response to a request by the edit screen control module 27. The device context 35 includes a rendering area used to render an object by the image data creating module 28. Further, the device context 35 has a storage area for storing setting information related to rendering such as line widths of straight lines for rendering (which is an example of type information). The image data creating module 28 obtains, from the OS 32, authorization to edit the rendering area of the device context 35 secured by the OS 32, and change the setting information and the like. After obtaining such authorization, the image data creating module 28 renders raster image data of an object in the rendering area of the device context 35 utilizing the API provided by the OS 32. It should be noted that the term "render" used in the specification sometimes means storing the raster image data in the device context 35. The raster image data includes a plurality of pieces of pixel data. The pixel data is image data for a unit of a pixel. Further, the pixel is a minimum unit of an image represented by image data.

The OS 32 performs the display process to display an image on the LCD 16 based on the raster image data and the setting information stored in the device context 35. That is, the OS 32 controls each dot of the LCD 16 based on the raster image data rendered in the rendering area, thereby performing the display process to display an image represented by the raster image data on the LCD 16.

The LCD 16 displays various pieces of information regarding the PC 10. The LCD 16 is connected to the bus 22 via the display I/F 15, and obtains display data through the I/F 15. The LCD 16 is configured such that the display screen thereof has a plurality of dots (an example of display pixels). It is noted that, according to the illustrative embodiment, the display need not be limited to the liquid crystal display, but other type of display (e.g., ELED: organic light emitting display) can be employed.

The input I/F 18 is an interface through which the user operations are input, and includes a keyboard and a mouse. It is noted that the input I/F 18 needs not be limited to the keyboard or the like, and may include a film-type touch sensor overlaid on a display screen of the LCD 16.

<Displaying Operation>

Figure 3:
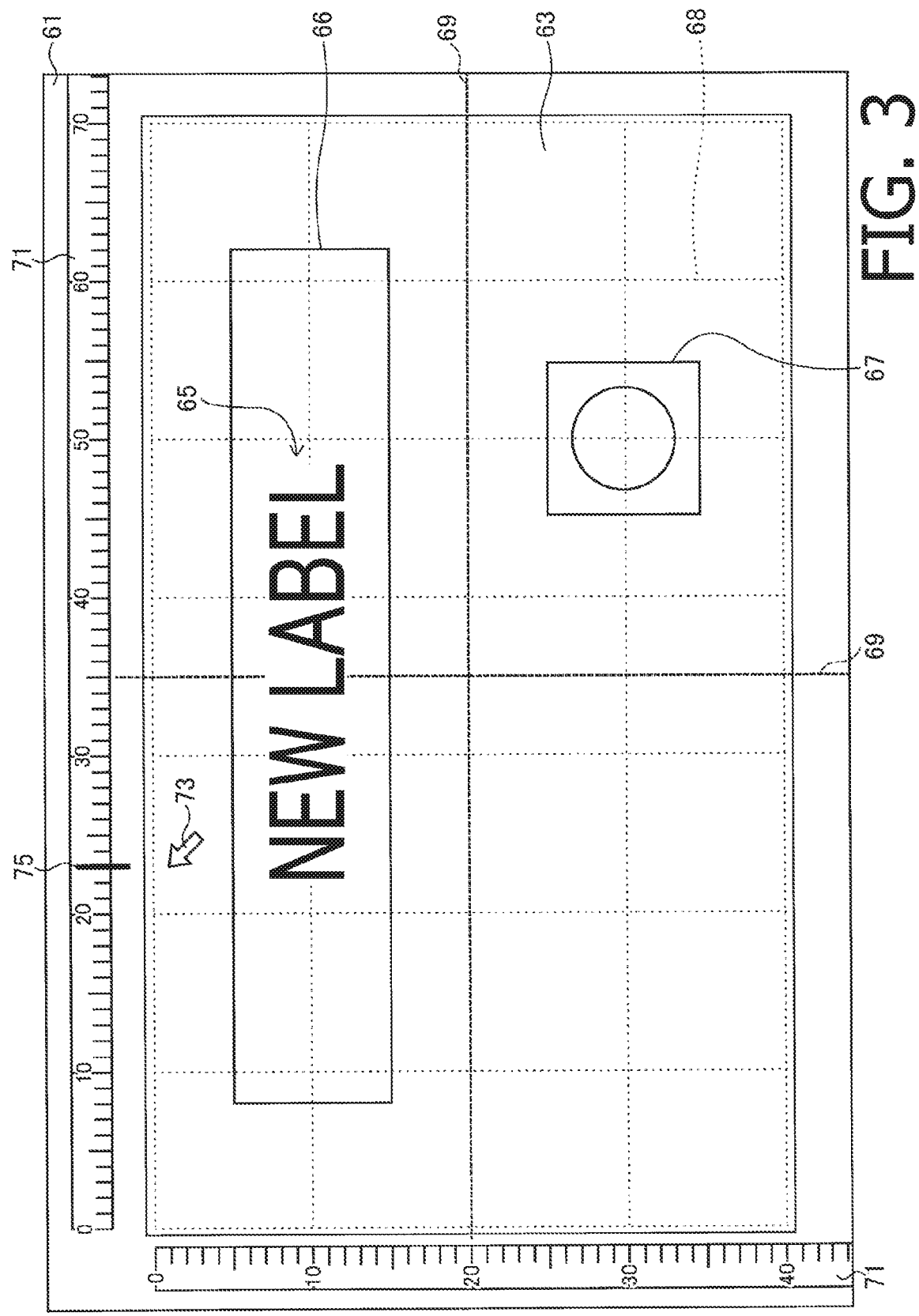
FIG. 3 shows a label edit screen displayed on an LCD of a PC of the printer system shown in FIG. 1.

Next, an operation of the image data creating module 28 when the text or auxiliary lines are to be displayed on a label edit screen will be described. FIG. 3 shows an example of a label edit screen 61 displayed on the LCD 16. As shown in FIG. 3, on the label edit screen 61, an editing area 63 for editing a label is displayed. The label edit screen 61 has a rectangular shape having a longer side extending, for example, in a longitudinal direction of a label to be created as shown in FIG. 3.

Within the editing area 63, in the example show in FIG. 3, a text object 65 in which a text "NEW LABEL" has been input is displayed. A frame surrounding the text object 65 is an object frame 66 indicating a location of the text object 65. Displaying or non-displaying of the object frame 66 is selectable. Further, within the editing area 63, an image 67 for the label is displayed. The image 67 for the label is a photograph or an image of a logo to be printed on the label.

In the editing area 63, grid lines 68 are displayed. The grid lines 68 are displayed as straight lines extending in two orthogonal directions (i.e., an up-down direction and a right-left direction in FIG. 3) such that the rectangular editing area 63 is divided into square areas arranged in matrix. Further, in the label edit screen 61, guide lines 69 indicating central positions in the up-down direction and in the right-left direction of the editing area 63 are indicated, respectively. Further, on an upper port and a left side part of the editing area 63, rulers 71 are displayed, respectively. Furthermore, in the editing area 63, an icon 73 indicating a positon of a mouse of the input I/F 18 is displayed. On the upper ruler 71, an indicating line 75 indicating a position of the icon 73 or a position of an object selected by the icon 73 is indicated. The indicating line 75 moves in the right-left direction along the upper ruler 71 synchronously with movement of the icon 73 in the right-left direction.

<Display of Text>

Figure 4:
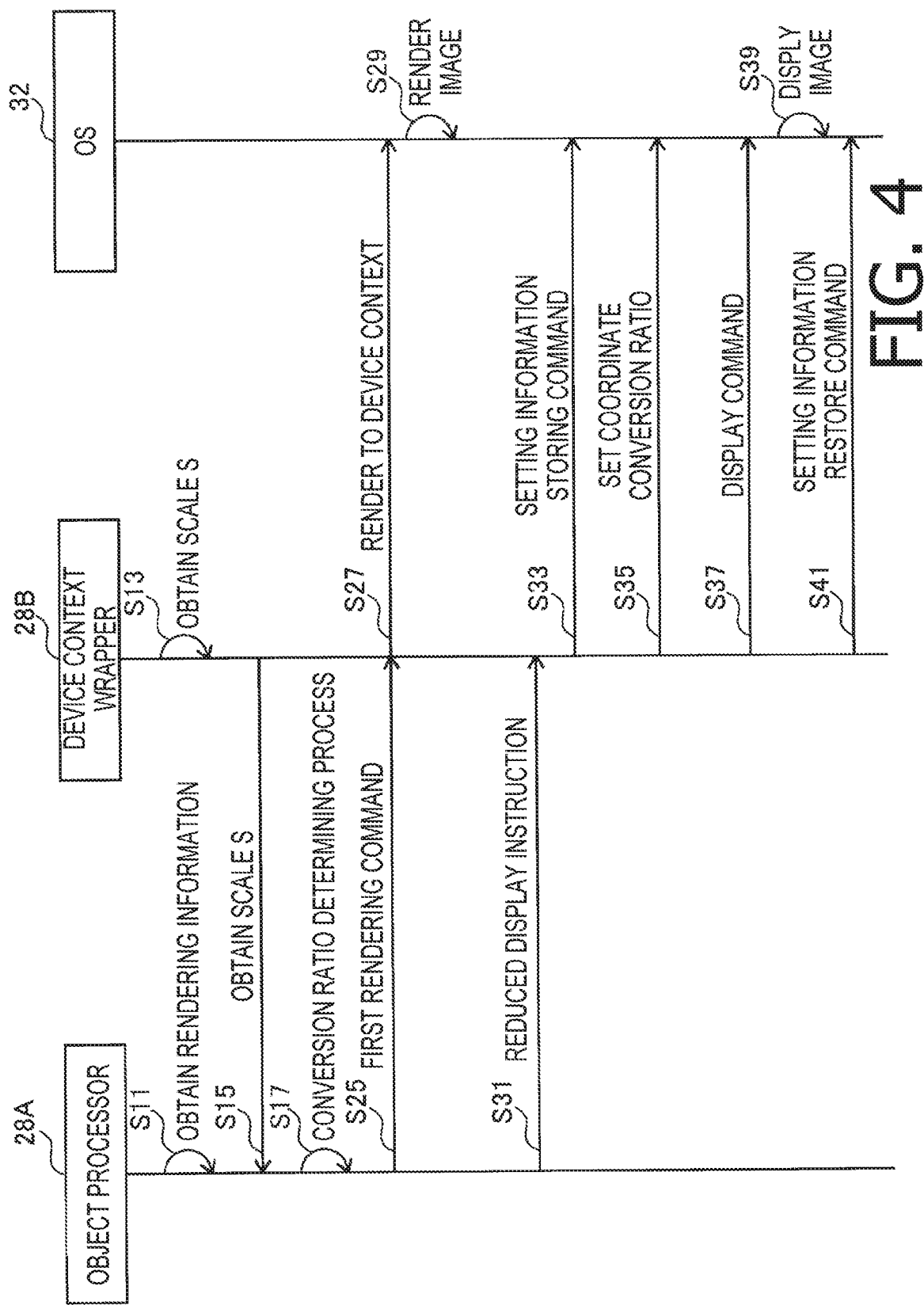
FIG. 4 is a sequence chart showing operational sequence performed by an image data creating module when a text is displayed.
Figure 5:
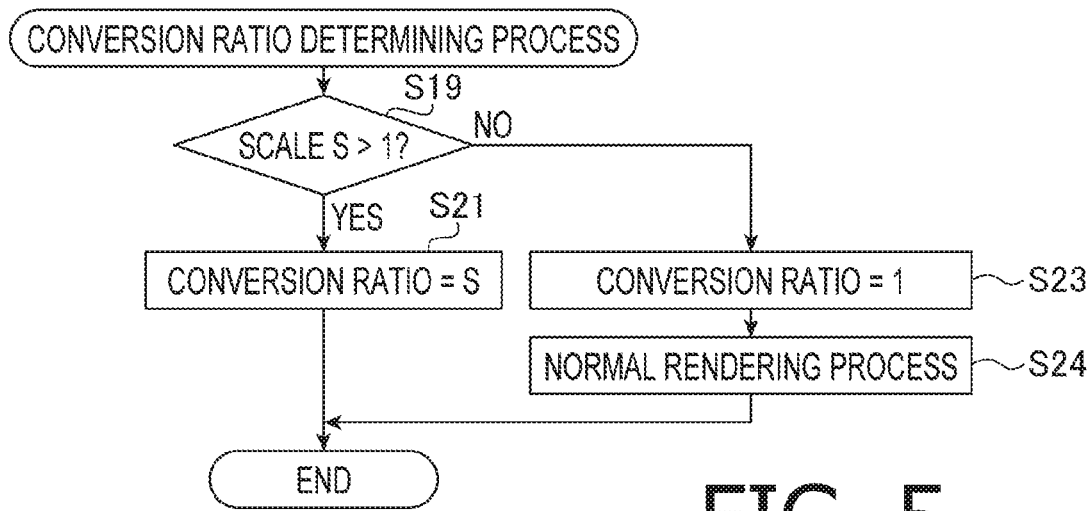
FIG. 5 is a flowchart illustrating a process of determining a conversion ratio of an object processor.

The image data creating module 28 performs expanding or the like of the raster image data rendered in the device context 35 to adjust the display image of the text in the displaying process of the text object 65 described above. FIG. 4 shows a sequence of the process performed by the image data creating module 28 when the text is displayed. FIG. 5 is a flowchart illustrating a conversion ratio determining process to determine the conversation ratio to be utilized by the object processor 28A.

The sequence charts and flowcharts basically show processes of the CPU 12 in accordance with instructions scripted in the programs. Processes indicated by terms "determine", "extract," "select," "calculate," "judge," "identify," "obtain," "receive," "control," "set" and "calculate" are the processes of the CPU 12. It is noted that the processes executed by the CPU 12 include a hardware control through the OS 32. It is further noted that the term "obtain" will be used to mean a concept in which a request is not necessary. That is, a process in which the CPU 12 receive data without requesting for the same is included in a concept that the CPU 12 obtains the data. Further, a term "data" in the specification is represented by a computer-readable bit array. A plurality of pieces of data having substantially the same meaning or contents but different formats will be treated as the same data. A term "information" used in the specification will be treated in the same manner Further, the processes of "instruct", "respond" and "request" are executed by communicating information or data indicating "instruct", "respond" and "request", respectively. Furthermore, the terms "instruct", "respond" and "request" may be stored as information or data meaning "instruct", "respond" and "request", respectively.

As shown in FIG. 1, the image data creating module 28 according to the illustrative embodiment includes an object processor 28A and a device context wrapper 28B. The object processor 28A and the device context wrapper 28B are processing modules included in the image data creating module 28. The object processor 28A is a processing module to determine whether the raster image data should be expanded. The device context wrapper 28B is configured to receive a command from the object processor 28A and transmit the command to the OS 32, and provide a shared interface to the object processor 28A which does not depend on a kind of an operation system (e.g., OS 32). The device context wrapper 28B converts the command or the like transmitted from the object processor 28A to an API format command provided by the OS 32. The object processor 28A transmits a rendering command and the like to the OS 32 through the device context wrapper 28B. Therefore, even if the kind of the OS 32 has been changed, the object processor 28A is capable of executing the rendering command and the like with use of the same commands or arguments by utilizing the API.

In S11 of the sequence chart shown in FIG. 4, the object processor 28A obtains the rendering information. It is noted that, when a rendering event to input a rendering command to the OS 32 has occurred, the object processor 28A obtains the rendering information corresponding to rendering event.

The edit screen control module 27 determines, in the process when the PC 1 is being booted or after the PC has been booted, whether a rendering event has been generated. The rendering event includes a starting event which is generated when the edit screen control module 27 is started. It is noted that there are plurality of types of rendering events. It is also noted that the edit screen control module 27 may determine which even is being generated based on not only the event information, but comparison between information indicating a location at which an operation input included in the event information has been done with status information of the edit screen control module 27. The status information may include information, which indicates a position or size of each of the objects displayed on the LCD 16 updates occasionally as needed, by the edit screen control module 27. According the illustrative embodiment, the booting (i.e., start-up) event and a plurality of rendering events are collectively referred to as the "rendering event" of the same of explanation.

The edit screen control module 27 is programmed such that which one of rendering processes is to be executed and which piece of rendering information is to be used are programmed in association with each of the staring event and the plurality of rendering events. The rendering events include ones in which a rendering process of text objects 65 and auxiliary lines is performed when the event is generated, and ones in which such a rendering process is not performed. It is noted that there may be a case in which a rendering event with which a plurality of rendering processes to render the text objects 65 and the auxiliary lines, and a plurality of rendering processes to render objects other than the text object 65 or the auxiliary line are associated.

For example, when receiving information to input a new text object 65 to the editing area 63 indicated on FIG. 3 in accordance with the operation input through the input I/F 18, the edit screen control module 27 recognizes that a rendering event to render the text object 65 and transmits a rendering command to the object processor 28A. In response to receipt of the rendering instruction from the edit screen control module 27, the object processor 28A obtains rendering information regarding the text object 65 to be rendered (S11). The rendering information includes, for example, contents of the text to be rendered, a rendering position, a font size, a type of the font and the like. In the following description, a case where a text rendering event using a scalable font is generated as the rendering event will be described. The scalable font is a data format in which a shape of each letter or character is stored as vector image data. When a text of the scalable font is rendered, the letter or character is rendered in accordance with the designated font size. Accordingly, the object processor 28A according to the illustrative embodiment executes, when the text of the scalable font is to be rendered as the rendering event, a display process shown in FIG. 4.

Further, as shown in FIG. 4, the device context wrapper 28B obtains scale S corresponding to the resolution of the LCD 16 (an example of characteristic information) in S13. The scale S here is a value indicating a ratio of the resolution when the resolution of a standard display is assumed to be one (i.e., a ratio of the resolution of the LCD 16 with respect to the resolution of the standard display). For example, for a display of which resolution is twice the resolution of the standard display, the value of the scale S is "2." The device context wrapper 28B obtains the value of the scale S by, for example, reading a setting file which has been stored in the memory 14 when the application program 26 is started. Alternatively, the device context wrapper 28B obtains the value of the scale S from the OS 32 through the application program 26.

Next, upon obtaining the rendering information in S11, the object processor 28A obtains the scale S from the device context wrapper 28B (S15). Then, in S17, the object processor 28A performs a conversion ratio determining process to determine a conversion ratio (an example of a first conversion ratio) to expand the raster image data to be rendered in the device context 35 based on the scale S obtained in S15.

FIG. 5 is a flowchart illustrating the conversion ratio determining process. In S19, the object processor 28A determines whether the obtained scale S is larger than "1," that is, whether the resolution of the LCD 16 is higher than the resolution of the standard display. When it is determined that the value of the scale S is larger than "1" (S19: YES), that is, when the LCD 16 is a high-resolution display, the object processor 28A sets the value of the scale S as the conversion ratio to be used (S21). Then, the object processor 28A terminates the process shown in FIG. 5, and performs step S25 (FIG. 4) onwards.

When it is determined that the value of the scale S is equal to or less than "1" (S19: NO), that is, when the LCD 16 is the standard display, the object processor 28A sets "1" as the conversion ratio (S23). In this case, since the resolution of the LCD 16 is relatively low, even if the number of pixels of the image data is increased by expanding raster image data, which will be described later, an image represented by the expanded image data cannot be displayed on the LCD 16. Therefore, the object processor 28A does not perform an expanding process and the like in S25 onwards in FIG. 4, while executes the rendering process on the device context 35 (S24) in accordance with the rendering information obtained in S11. The image data creating module 28 then terminates the rendering process shown in FIGS. 4 and 5.

After the object processor 28A sets the conversion ratio to the value of the scale S (FIG. 5: S21), and starts the process in S25 onwards (FIG. 4), the object processor 28A transmits the first rendering command including the rendering information obtained in S11 and expansion rendering instruction information concerning the conversion ratio to the OS 32 through the device context wrapper 28B. The expansion rendering instruction information is instruction information instructing the OS 32 to render the raster image data of the object 65 subject to the rendering command in the rendering area of the device context 35 with expanding the same at the conversion ratio. In other words, the conversion ratio indicates a ratio of the size of the expanded raster image data with respect to the size of the raster image data which would be rendered in the device context 35 in accordance with the rendering command not including the expansion rendering instruction information.

The device context wrapper 28B instructs the OS 32 to render the image in the device context 35 based on the rendering information and the expansion rendering instruction information received in S25 from the object processor 28A (S27). The device context wrapper 28B causes the OS 32 to execute the rendering command using, for example, the API. The OS 32 then executes rendering in the rendering area of the device context 35 (S29). For example, the OS 32 identifies the vector image data of the scalable font to be displayed on the LCD 16 based on the rendering information obtained from the device context wrapper 28B. Then, the OS 32 magnifies the image indicated by the vector image data of the identified scalable font based on the conversion ratio of the expansion rendering instruction information obtained from the device context wrapper 28B, and render the same in the device context 35 as the raster image data. That is, the OS 32 renders the raster image data which has been expanded based on the resolution of the LCD 16 in the device context 35.

Next, the object processor 28A transmits the reduced display instruction information to the OS 32 through the device context wrapper 28B (S31). The reduced display instruction information is for instructing the OS 32 to display the image indicated by the image, which has been magnified at the magnification ratio equal to the value of the scale S, on the LCD 16 in a reduced manner. The object processor 28A instructs the OS 32 to reduce the image which is the magnified image indicated by the raster image data by multiplying a ratio of 1/S and display the thus reduced image on the LCD 16. That is, the object processor 28A according to the illustrative embodiment instructs the OS 32 to display the image by reducing the same at a ratio which is an inverse number of the magnification ratio at which the image represented by the raster image data has been magnified. It is noted that the object processor 28A may transmit the first rendering command (S25) and the reduction instruction (S31) to the OS 32 at the same time.

When receiving the reduced display instruction information in S31, the device context wrapper 28B executes a command of temporarily storing setting information of the device context 35 in the OS 32. As above, the device context 35 has a storage area, besides the rendering area, configured to store the setting information regarding rendering of the image (e.g., a line thickness of straight lines to be rendered). The setting information includes coordinate of the rendering area at which the image represented by the raster image data is rendered, and the conversion ratio at which the image represented by the raster image data is displayed on the LCD 16 (hereinafter, referred to as coordinate conversion ratio). The coordinate conversion ratio is a value indicating a correspondence relationship between a logical coordinate in the rendering area and a position of a dot on the LCD 16, that is, a physical coordinate of a dot on the LCD 16.

When, for example, the coordinate conversion ratio is "1," the OS 32 associates the logical coordinate of the rendering area with the physical coordinate of the dot at a ratio of one to one. When the logical coordinate and the physical coordinate are indicated by X-Y coordinates, pixel data of the rendering area and X=3 and Y=3 is indicated at a dot of which logical coordinates are X=3 and Y=3. The image indicated by the raster image data is displayed on the LCD 16 with its size being maintained. If the coordinate conversion ratio is 1/2, the OS 32 associates the logical coordinate with the physical coordinate of the dot at a ratio of two to one. In this case, the pixel data at X=3 and Y=3 of the rendering area is indicated by the dot at X=1.5 and Y=1.5 of the logical coordinate. The image indicated by the raster image data rendered in the rendering area is displayed on the LCD 16 with being reduced to ½ size with the number of pixels being maintained. When, for example, the coordinate conversion ratio is two, the OS 32 associates the logical coordinate with the physical coordinate of the dot at a ratio of one to two. In such a case, the pixel data at X=3 and Y=3 of the rendering area is indicated by the dot at X=6 and Y=6 of the logical coordinate. Thus, the image indicated by the raster image data is displayed on the LCD 16 with being magnified to twice the size with the number of pixels being maintained.

It is noted that whether there exists a dot corresponding to decimal coordinates (e.g., X=1.5 and Y=1.5) depends on the resolution of the LCD 16. That is, for the standard display, the dot only exists at a position corresponding to integer coordinates, and the pixel data corresponding to decimal coordinates (e.g., X=1.5 and Y=1.5) is not reflected. In contrast, when the display is of a high resolution (e.g., when the display has twice the number of dots of the standard display), there exists a dot corresponding to, for example, the coordinate of X=1.5, and such pixel data is reflected in the image displayed on the LCD 16. Accordingly, the image data creating module 28 of the illustrative embodiment is configured such that, when the scale S of the LCD 16 is larger than one (i.e., when the LCD 16 is a high-resolution display), the raster image data is expanded by the value S of the scale, thereby the number of pieces of the pixel data being increased. Further, by displaying the image represented by the expanded raster image data by reducing the same to 1/S size on the LCD 16, it becomes possible to display the image with the number of dots used for displaying the image being increased (i.e., the number of pieces of the pixel data for a unit area being increased) depending on how high the resolution of the LCD 16.

The device context wrapper 28B instructs the OS 32 to store the current setting information based on the reduce display instruction information obtained in S31 prior to changing the coordinate conversion ratio (S33). The OS 32 temporarily stores the current setting information stored in the device context 35 in the memory 14 or the like based on the instruction output by the device context wrapper 28B.

Next, the device context wrapper 28B instructs the OS 32 to change the setting information of the device context 35 (i.e., the setting of the coordinate conversion ratio) (S35). Since the device context wrapper 28B receives a command to reduce the size to 1/S from the object processor 28A in S31, the device context wrapper 28B instructs the OS 32 to set the value of "1/S" to the coordinate conversion ratio. It is noted that the device context wrapper 38B instructs the setting of the coordinate conversion ratio using, for example, the API.

Figure 6A:
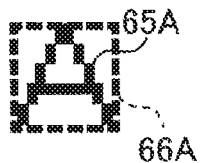
FIGS. 6A and 6B show a text object and an object frame before adjustment and after adjustment.
Figure 6B:

Next, the device context wrapper 28B instructs the OS 32 to display an image on the LCD 16 based on the information of the device context 35 (S37). The OS 32 controls the dots of the LCD 16 based on the setting information of the device context 35 and the raster image data to display the image represented by the raster image data (S39). Since the coordinate conversion ratio has been changed in S35, the device context wrapper 28B transmits a restoration command to the OS 32 to restore the setting information stored in S33 (i.e., the information before changed) (S41). As above, the image data creating module 28 according to the illustrative embodiment executes an adjusting process to expand the raster image data of the text object 65, and display the expanded raster image data in a reduced manner FIGS. 6A and 6B show how the text object 65 is displayed before and after the above-described adjustment is applied. FIG. 6A shows the text object 65A before the adjustment, and FIG. 6B shows the text object 65B after the adjustment. As shown in FIGS. 6A and 6B, since the number of pieces of pixel data is small before the adjustment, the text object 65A is shown such that an outline thereof is jagged. Regarding the text object 65B after adjustment (FIG. 6B), when it is rendered as the raster image data in S29 (FIG. 4), the size is expanded by S times based on the first conversion ratio. Thus, the number of pieces of pixel data of the text object 65B has been increased, accordingly. Then, in S39 (FIG. 4), the image represented by the expanded raster image data is displayed in a manner reduced to 1/S with maintaining the number of pieces of pixel data based on the coordinate conversion ratio. Thus, the number of pieces of pixel data (i.e., the number of dots) of the text object 65B for a unit area has been increased. By displaying the text object 65B on the high-resolution LCD 16, it is possible to display the text object 65B of which outline is smoothed as shown in FIG. 6B.

<Print Process>

According to the above-described example, the image data creating module 28 performs magnification of the raster image data and the like when the text object 65 is displayed on the LCD 16. On the other hand, according to the present embodiment, the image data creating module 28 does not perform magnification of the raster image data when the text object 65 is printed.

For example, in the memory 14 a print data area (an example of an image formation area) is secured to store the rendering information and the setting information for printing. The OS 32 executes printing using the printer 50 or the printer 51 based on the print image data (example of image formation image data) stored in the print data area of the memory 14. For example, when receiving the print command from the edit screen control module 27, the edit screen control module 27 obtains print characteristic information (an example of image formation characteristic information) regarding the print resolution (e.g., dpi) from the printers 50 and 51. Then, the object processor 28A input the print command including the print characteristic information stored in the print data area of the memory 14 and the print image data to the OS 32, thereby the print process being performed. In this case, the object processor 28A does not expand the raster image data of the print-target text object 65 and the like based on the print resolution. The object processor 28A prints the print-target text object 65 and the like based, for example, on the print setting.

According to the above-described example, the object processor 28A executes a process of expanding the raster image data by executing the first rendering command with respect to the OS 32 in S25 (FIG. 4). That is, the object processor 28A generates the expanded raster image data through the OS 32. Alternatively, the process of creating the expanded raster image data may be executed by the object processor 28A. In such a case, the object processor 28A does not input the first rendering command into the OS 32. The object processor 28A may set the value of the scale S as the conversion ratio in S21 (FIG. 5), and expand the raster image data based on the rendering information obtained in S11 and the expansion rendering instruction information regarding the conversion ratio. The object processor 28A expands the raster image data using, for example, the data storage area 34 of the memory 14.

Next, the object processor 28A inputs the reduced display instruction information to the OS 32 through the device context wrapper 28B (S31). The reduced display instruction information is instruction information directed to the OS 32 to display the image represented by the raster image data having been expanded by the object processor 28A in a reduced manner With this configuration, expansion of the raster image data can be executed by the object processor 28A not through the OS 32. Further, it becomes possible to display the expanded raster image data on the LCD 16 in a reduced manner In the above-described embodiment, the device context wrapper 28B receives the reduced display instruction from the object processor 28A (S31). That is, the object processor 28A determines the reduction ratio. Alternatively, the device context wrapper 28B may determine the reduced display instruction information, and thus, the reduction ratio of the expanded raster image data. The device context wrapper 28B has obtained the scale S in S13 (FIG. 4). Therefore, it becomes possible that the device context wrapper 28B determines the reduction ratio (e.g., 1/S) based on the information received in S13. In such a case, the object processor 28A does not transmit the instruction of reduced display to the device context wrapper 28B, but may transmit only the rendering instruction of the expanded raster image data (S31). Then, the device context wrapper 28B may determine the reduction ratio in accordance with the rendering command received from the object processor 28A, and instruct the OS 32 to display the reduced raster image data (S35, and S37).

<Displaying of Auxiliary Line>

Next, displaying of the auxiliary line will be described. The straight lines used to indicate the object frame 66, the guide lines 69, lines used for graduations of the ruler 1, the indicating line 75 shown in FIG. 3 are auxiliary lines which are to be referred ty by the user when the user performs a label editing work. It is preferable to use as thin line as possible for the auxiliary lines so as not to obstacle the editing work. It is noted that the minimum thickness of the auxiliary lines is thinner as the resolution of the LCD 16 is higher. Therefore, according to the illustrative embodiment, the image data creating module 28 uses as thinner line as possible in the displaying process of the auxiliary lines based on the scale S of the LCD 16. In the following description, processes similar to those in the text displaying process will be simplified or omitted.

FIG. 7 shows a sequence of the image data creating module 28 when the auxiliary lines are displayed. Firstly, in S51 (FIG. 7), the object processor 28A obtains the rendering information regarding rendering of the auxiliary lines. It is noted that, when there occurs a rendering event to input a rendering command to the OS 32, the object processor 28A obtains the rendering information corresponding to the rendering event. For example, when the edit screen control module 27 receives a command to change a display setting of the object frame 66 shown in FIG. 3 from the non-displaying state to a displaying state in response to the operation input through the input I/F 18, the edit screen control module 27 assumes that the rendering event to render the auxiliary lines is generated and transmits the rendering command to the object processor 28A.

In response to receipt of the rendering command from the edit screen control module 27, the object processor 28A obtains the rendering information regarding the auxiliary lines to be rendered (S51). The rendering information indicates starting points and ending points of the auxiliary lines, respectively. Further, the rendering information also includes information regarding a pen for rendering the auxiliary lines. It is noted that the term "pen" indicates setting information related to lines for rendering the auxiliary lines and includes a line thickness for curved or straight lines), a line color, a shape of an end of each line and the like. The device context wrapper 28B obtains a value indicating a ratio of the resolution when the resolution of the standard display is assumed to be one (S53).

Next, the object processor 28A inputs the rendering command of the auxiliary lines to the OS 32. According to the illustrative embodiment, when a plurality of auxiliary lines are to be rendered, the object processor 28A transmits a pen setting command (S55) and the rendering command (S63) shown in FIG. 7 to the OS 32 alternately to render the plurality of auxiliary lines one by one. Firstly, the object processor 28A sets the pen via the device context wrapper 28B in S55. For example, when an auxiliary line is rendered, a thin pen is designated as the rendering information by the edit screen control module 27. The thin pen here is, for example, a cosmetic pen which is used in a function regarding image rendering used in the Windows®, which is a pen for drawing a line of which width is one dot. According to the illustrative embodiment, when the line width information of the pen indicates a value "0," the line width of the pen is set to be 1 dot. Further, when the line width information of the pen indicates a decimal value between 1 and 0 (e.g., a value "½"), the line width of the pen is set to be 1 multiplied by the decimal value (e.g., "½"). Thus, even if the line width information of the pen indicates a value larger than "0" which corresponds to the lien with of 1 dot, the designated line with of the pen is less than 1 dot.

The object process 28A outputs the commando to use the pen of which line width is W1 when the auxiliary lines are rendered in S55. In response to the above command, in S57, the device context wrapper 28B executes a process of changing the line width W1 to another line width W2 which is thinner than the line width W1 in accordance with the scale S obtained in S53.

Figure 8:
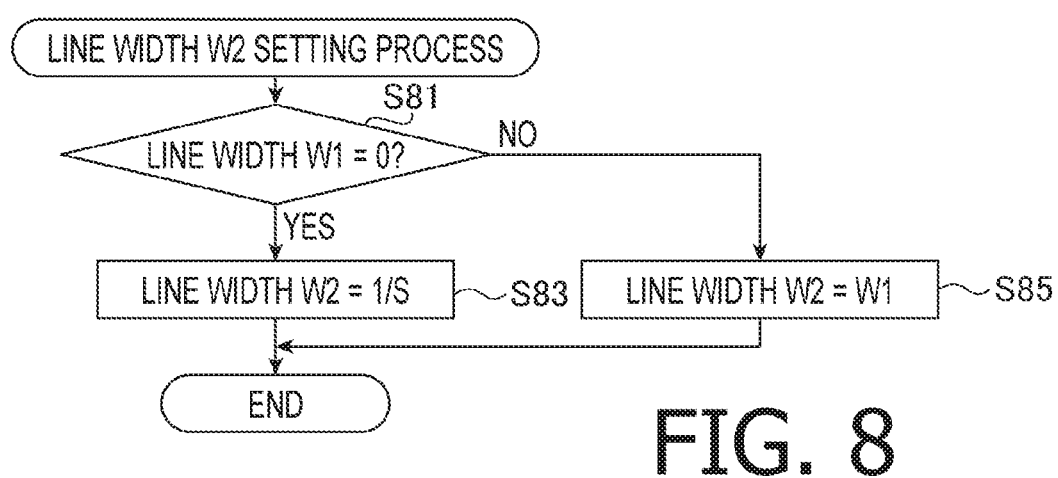
FIG. 8 is a flowchart illustrating a line width setting process to set a line width by a device context wrapper.

FIG. 8 is a flowchart of a process of setting the line width to W2, which is executed by the device context wrapper 28B in S57. Firstly, in S81, the device context wrapper 28B determines whether the value of the line width W1 obtained, in SM, from the object processor 28A in S55 is "0." When the value of the line width W1 is "0" (S81: YES), the device context wrapper 28B sets a value 1/S as the changed line width (S83). Accordingly, if the resolution of the LCD 16 is twice the resolution of the standard display, that is the value of the scale S is "2," the device context wrapper 28B outputs the rendering command to render a thin line such as the cosmetic pen, and sets "0" to the line width W1, while the value of the line width W2 is "½." As a result, in comparison with a case when the line width W1 is set to "0" (i.e., the line width is one dot), the converted line width W2 designates a thinner line width (i.e., ½ times). As a result, when the line width W1=0 is designated by the OS 32 or the edit screen control module 27 to render thin lines, the device context wrapper 28B converts the value of the scale S, that is, converts the command to render thinner lines in accordance with the value of the resolution of the LCD 16.

When it is determined that the value of the line width W1 is not "0" (S81: NO), the device context wrapper 28B sets the value of the line width W1 to the converted value of the line width W2 (S85). Therefore, when the line width W1 which is thicker than 1 dot is designated, the device context wrapper 28B sets the designated width to the line width W2 without changing the value of the line width W1.

When the process shown in FIG. 8 has been executed, the device context wrapper 28B transmits a command instructing to store the setting information including the value of the line width W2 as determined in the device context 35 to the OS 32 (S58). The setting information here is the information included in the rendering information obtained in S51, and includes information regarding the thickness of the lines used for rendering the auxiliary lines. The OS 32 stores the setting information obtained from the device context wrapper 28B in the device context 35 (S59). It is noted that the device context wrapper 28B instructs the OS 32 to store the setting information through, for example, the API.

In response to the setting information regarding the line width W2 being newly stored in the device context 35, the device context wrapper 28B transmits the pen information originally stored in the device context 35 to the object processor 28A (S61). Then, after completion of rendering a first auxiliary line, the object processor 28A can restore the setting information of the device context 35 to the information before the change using the originally stored pen information obtained in S51 (S69, S71).

When the original pen information is obtained from the device context wrapper 28B, the object processor 28A transmits the rendering command to the OS 32 through the device context wrapper 28B (S63). In accordance with the rendering command transmitted from the object processor 28A, the device context wrapper 28B transmits the rendering command to the OS 32 using the API (S65). Based on the information obtained from the device context wrapper 28B, the OS 32 renders the raster image data of the auxiliary lines in the rendering area of the device context 35. Then, based on the setting information in the device context 35 stored in S59 (e.g., the information regarding the line width W2) and the raster image data rendered in the rendering area, the OS 32 displays the image of the auxiliary lines on the LCD 16 (S67). Thus, when the resolution of the LCD 16 is higher than that of the standard display, it becomes possible to display the auxiliary line which is thinner than the auxiliary lines of which width is 1 dot. For example, as shown in FIG. 6A, an object frame 66A before adjustment is done is displayed with the line width of 1 dot. In contrast, as shown in FIG. 6B, an object frame 66B after adjustment is indicated with thinner lines in accordance with the resolution. With this configuration, when the label edit screen 61 (FIG. 3) is displayed, an edit-target object 65 and the auxiliary lines which are not subject to edition can be displayed such that they can easily be distinguished from each other.

As shown in FIG. 7, after transmitting the rendering command to the OS 32 (S63), the object processor 28A transmits the command to restore the originally set pen information obtained in S61 to the OS 32 through the device context wrapper 28B (S69, S71). Based on the command from the device context wrapper 28B, the OS 32 restores the pen setting information of the device context 35 to the state before S59 was executed. With this configuration, at every rendering of the auxiliary line, the pen setting can be restored.

In the example described above, the auxiliary lines are described as examples of thin lines. It should be noted that rendering of thin lines in accordance with the scale S of the LCD 16 may be employed for displaying other lines. The image data creating module 28 may be configured such that, when the rendering command explicitly designating the line width W1 in accordance with the operation input through the input I/F 18 is received, the image data creating module 28 may render the lines having the line width W1 as designated.

Specifically, the rendering command explicitly designating the line width is, for example, the rendering command associated with a value of the line width which is input through the input I/F by the user. A method of designating the line width may include inputting of a concrete value of the line width, or indicating a degree of the line width (e.g., "relatively thick").

A case where the line width is designated non-explicitly is a case where the line width has been designated in advance as an initial value. For example, for the cosmetic pen used for rendering the auxiliary lines, the line width is preliminarily defined as an initial value in application programs and OS 32. When the line width is designated explicitly, it is likely that the user who is creating a label may designate a desired or preferred line width. Therefore, in such a case, it is preferable that the lines are rendered with the designated line width. Accordingly, when receiving the rendering command in which the line width W1 is explicitly designated, the image data creating module 28 performs rendering the lines with the designed line width W1.

According to the illustrative embodiment described above, when the text is displayed, the object processor 28A instructs the OS 32 to render the raster image data indicated by the rendering information with expanding the same at the conversion ratio based on the value of the scale S related to the resolution of the LCD 16 (S25, S27, S29). With this configuration, the number of pieces of pixel data included in the raster image data increases in accordance with the resolution of the LCD 16, that is, the value of the scale S. Then, the object processor 28A instructs the OS 32 to display the image represented by the expanded raster image data in a manner reduced to 1/S size based on the coordinate conversion ratio on the LCD 16 (e.g., S31). According to this configuration, when the image represented by the raster image data is displayed on the LCD 16, the number of dots used for display in a unit area, namely, the number of dots controlled for displaying the image is increased. Thus, by displaying the image represented by the expanded raster image on the high-resolution LCD 16, the performance of the LCD 16 can be well utilized.

When the auxiliary lines are rendered, the device context wrapper 28B identifies the line width W2 which is thinner than the line width W1 based on the scale S related to the resolution of the LCD 16 (S57). By displaying the auxiliary lines with identified line width W2, it becomes possible to utilize the performance of the LCD 16.

It is noted that the PC 10 is an example of an information processing apparatus, and the LCD 16 is an example of a display. The device context 35 is an example of a rendering area. The printers 50 and 51 are examples of an image forming device.

<Effects of Illustrative Embodiment>

According to the illustrative embodiment, the object processor 28A sets the conversion ratio to "1" (S23) when the scale S is "1" (S19: NO). Further, when the scale S is "1," the object processor 28A does not input the reduced display instruction information to the OS 32. According to the above configuration, when the scale S is "1," that is, when the resolution of the LCD 16 is equal to the resolution of the standard display, the object processor 28A does not expand the raster image data. As a result, it is possible to suppress execution of unnecessary process to increase the number of pixels of the text object 65 when the resolution of the LCD 16 is relatively low.

When the rendering information does not include information to render the vector image data, the object processor 28A may not instruct the OS 32 to execute the expanding process or the like. Thus, when the vector image data using a scalable font is displayed, the OS 32 executes the expanding/reducing process in accordance with the resolution of the LCD 16. On the other hand, when the raster image data using, for example, a bitmap font is displayed, the expanding process according to the resolution of the LCD 16 is not executed. Similarly, when the image 67 for the label is a dot image, the expanding process according to the resolution of the LCD 16 is not executed. According to the above configuration, the expanding process is executed before the image data to be displayed is converted to the raster image data which represents an image by aggregation of dots (i.e., when the image data to be displayed is the vector image data), it is possible to display an image according to the high resolution of the LCD 16.

When the text with the scalable font is displayed, the expanding/reducing process in accordance with the resolution of the LCD 16 is performed, and it is possible to display the text with utilizing the performance of the LCD 16.

The object processor 28A instructs the OS 32 to render the raster image data indicated by the rendering information in the rendering area with expanding the same according to the conversion ratio corresponding to the scale S. Further, the object processor 28A instructs the OS 32 to display the image represented by the expanded raster image data with reducing the image in accordance with the scale S on the LCD 16. With the above configuration, expanding of the image data and reduction of the image can be performed in accordance with the scale S, thereby the image being displayed in accordance with the resolution of the LCD 16.

The device context wrapper 28B instructs the OS 32 to expand the raster image data and display the image in a reduced manner using the API. According to this configuration, by utilizing the functions provided by the OS through the API, it becomes possible to transmit the conversion ratio and the coordinate conversion ratio easily and securely.

The image data creating module 28 does not expand the raster image data when the text object 65 is printed. Thus, the object processor 28A instructs the OS 32 to print the text object 65 based on the print characteristic information, thereby the text object 65 being printed appropriately in accordance with the characteristics of the printer 50 or 51.

In rendering the auxiliary lines, the characteristic information includes a scale indicating the ratio of the resolution of the LCD 16. Accordingly, by identifying the line width of the auxiliary lines in accordance with the scale S and displaying the auxiliary lines with the identified line width on the high-resolution LCD 16, the display utilizing the performance of the LCD 16 can be realized.

The device context wrapper 28B identified a 1/S of the line width W1 as the line width W2 (S83). With this configuration, the line width in accordance with the scale S (i.e., the characteristic information) can be appropriately identified.

When the line width W1 is explicitly designated by the rendering command, the image data creating module 28 does not identify the line width W2. Accordingly, when there is explicit designation of the line width, the designated line width is prioritized, and lines are displayed with the designated line width. According to this configuration, a case where the line width is changed although there is explicit designation of the same can be suppressed, and the lines can be displayed with the explicitly designated line width.

The lines indicated by the rendering information are the auxiliary lines. Accordingly, the auxiliary lines which are to be referred to when the user performs the editing work can be made thinner lines which are displayable, based on the resolution. Therefore, it becomes possible that the images (e.g., text) subject to edition and images displayed only for assisting the edition work can be made easily distinguishable.

It is noted that the aspects of the present disclosures need not be limited to the above-described embodiment, but can be embodied with various types of modifications and improvements based on knowledge of person skilled in the field.

For example, according to the illustrative embodiment, the object processor 28A executes the conversion ratio determining process (FIG. 4: S17). This configuration may be modified such that the device context wrapper 28B determines the conversion ratio determining process. Further, in the above-described illustrative embodiment, the device context wrapper 28B executes the line width W2 setting process (FIG. 7: S57). However, the object processor 28A may be configured to perform the line width W2 setting process.

Further, in the above-described illustrative embodiment, a case where the process of the application program 26, including the image data creating module 26, is executed by the CPU 12. However, the aspects of the present disclosure need not be limited to such a configuration. That is, the PC 10 may execute the processes of the application program 26 with use of an ASIC or other logical circuits instead of or in addition to the CPU 12.

In the above-described illustrative embodiment, the device context 35 is described as an area of the memory. However, the device context 35 may be configured to be provided with a program executing a particular process. For example, the device context 35 may be an object in an object-oriented programming language, or provided with a method receiving instructions externally.

What is claimed is:

1. A non-transitory computer-readable medium for an information processing apparatus having a display, a memory and a controller, the display having a plurality of display pixels, an operating system being installed in the information processing apparatus, the non-transitory computer-readable medium storing instructions realizing a controlling program, wherein, when a rendering command is received by the operating system from a program installed in the information processing apparatus, the operating system is capable of performing a rendering process of rendering raster image data in a rendering area secured in the memory in accordance with the received rendering command, the raster image data having a plurality of pieces of pixel data, each of the plurality of pieces of pixel data is image data for a unit of a pixel, wherein the operating system causes, when executed, the controller to perform a display process to display an image represented by the raster image data rendered in the rendering area by controlling the plurality of display pixels based on the raster image data rendered in the rendering area of the memory, wherein the controlling program causes, when executed, the controller to perform:
when a rendering event requiring input of the rendering command to the operating system is generated, a rendering information obtaining process to obtain rendering information corresponding to the rendering event;
a characteristic information obtaining process of obtaining characteristic information regarding a resolution of the display; and
a raster image data generating process to generate the raster image data using the rendering information and based on the characteristic information,
wherein, when the characteristic information indicates that the resolution of the display is a particular high resolution which is higher than a standard resolution corresponding to a standard display, the controller performs:
inputting, in the operating system, expansion rendering instruction information to render the raster image data by expanding the raster image data indicated by the rendering information at a first conversion ratio, the first conversion ratio being a conversion ratio corresponding to the characteristic information as obtained, the first conversion ratio being a conversion ratio assuming a size of non-expanded raster image data as one, the non-expanded raster image data being the raster image data generated in the raster image data generating process when using the rendering information without including the expansion rendering instruction information as an input; and
a first input process of inputting, in the operating system, reduced display instruction information, the reduced display instruction information being information instructing the operating system to display an image represented by the raster image data rendered in the rendering area at the first conversion ratio when the operating system executes the display process, and
wherein, when the characteristic information indicates that the resolution of the display is the standard resolution, the controller performs:
inputting, in the operating system, non-expansion rendering instruction information to render the non-expanded raster image data; and
inputting, in the operating system, display instruction information instructing to display an image represented by the non-expanded raster image data rendered in the rendering area without reducing when the operating system executes the display process.

2. The non-transitory computer-readable medium according to claim 1,
wherein the characteristic information is a scale indicating a ratio of a resolution of the display to a particular resolution, and
wherein the raster image data generating process is performed based on the rendering information without including the expansion rendering instruction information when the scale is one.

3. The non-transitory computer-readable medium according to claim 1, wherein, in the raster image data generating process:
when the rendering information includes information to render vector image data, the raster image data is generated by expanding the vector image data at the first conversion ratio, and
when the rendering information does not include the information to render the vector image data, expanding of raster image data represented by the rendering information is not performed.

4. The non-transitory computer-readable medium according to claim 3, wherein the vector image data is image data of a scalable font.

5. The non-transitory computer-readable medium according to claim 1,
wherein the characteristic information includes a scale indicating a ratio of the resolution of the display with respect to a particular resolution,
wherein the raster image data generating process is performed based on the raster image data indicated by the rendering information at the first conversion ratio corresponding to the scale, and
wherein, in the first input process, the controller instructs the operating system to display an image represented by the raster image data rendered in the rendering area at the first conversion ratio on the display in a manner reduced in accordance with the scale.

6. The non-transitory computer-readable medium according to claim 1, wherein, in the first input process, the controller inputs the reduced display instruction information to the operating system using a function the operating system has.

7. The non-transitory computer-readable medium according to claim 1,
wherein the information processing apparatus is connected to an image forming device,
wherein the operating system is configured to perform image formation using the image forming device based on image data for image formation stored in an image formation area, the image formation area being an area secured to the memory, and
wherein the controlling program causes, when executed, the controller to perform a second input process of inputting an image formation command including the characteristic information stored in the image formation area and the image data for image formation, the characteristic information being information related to a resolution in an image formation performed by the image forming device.

8. A method of controlling an information processing apparatus having a display and a memory, the display having a plurality of display pixels, an operating system being installed in the information processing apparatus, wherein, when a rendering command is received by the operating system from a program installed in the information processing apparatus, the operating system is capable of performing a rendering process of rendering raster image data in a rendering area secured in the memory in accordance with the received rendering command, the raster image data having a plurality of pieces of pixel data, each of the plurality of pieces of pixel data being image data for a unit of a pixel, wherein a display process is executed to display an image represented by the raster image data rendered in the rendering area by controlling the plurality of display pixels based on the raster image data rendered in the rendering area of the memory,
wherein the method executes:
a rendering information obtaining process to obtain rendering information corresponding to a rendering event when the rendering event requiring input of the rendering command to the operating system is generated;
a characteristic information obtaining process of obtaining characteristic information regarding a resolution of the display; and
a raster image data generating process to generate the raster image data using the rendering information and based on the characteristic information,
wherein, when the characteristic information indicates that the resolution of the display is a particular high resolution which is higher than a standard resolution corresponding to a standard display, the method executes:
inputting, in the operating system, expansion rendering instruction information to render the raster image data by expanding the raster image data indicated by the rendering information at a first conversion ratio, the first conversion ratio being a conversion ratio corresponding to the characteristic information as obtained, the first conversion ratio being a conversion ratio assuming a size of non-expanded raster image data as one, the non-expanded raster image data being the raster image data generated in the raster image data generating process when using the rendering information without including the expansion rendering instruction information as an input; and
inputting, in the operating system, reduced display instruction information, the reduced display instruction information being information instructing the operating system to display an image represented by the raster image data rendered in the rendering area at the first conversion ratio when the operating system executes the display process, and
wherein, when the characteristic information indicates that the resolution of the display is the standard resolution, the method executes:
inputting, in the operating system, non-expansion rendering instruction information to render the non-expanded raster image data; and
inputting, in the operating system, display instruction information instructing to display an image represented by the non-expanded raster image data rendered in the rendering area without reducing when the operating system executes the display process.

9. An information processing apparatus having a display, a memory and a controller, the display having a plurality of display pixels, an operating system being installed in the information processing apparatus, wherein, when a rendering command is received by the operating system from a program installed in the information processing apparatus, the operating system is capable of performing a rendering process of rendering raster image data in a rendering area secured in the memory in accordance with the received rendering command, the raster image data having a plurality of pieces of pixel data, each of the plurality of pieces of pixel data being image data for a unit of a pixel, wherein a display process is executed to display an image represented by the raster image data rendered in the rendering area by controlling the plurality of display pixels based on the raster image data rendered in the rendering area of the memory,
wherein the controller is configured to perform:
when a rendering event requiring input of the rendering command to the operating system is generated, a rendering information obtaining process to obtain rendering information corresponding to the rendering event;
a characteristic information obtaining process of obtaining characteristic information regarding a resolution of the display; and
a raster image data generating process to generate the raster image data using the rendering information and based on the characteristic information,
wherein, when the characteristic information indicates that the resolution of the display is a particular high resolution which is higher than a standard resolution corresponding to a standard display, the controller performs:

inputting, in the operating system, expansion rendering instruction information to render the raster image data by expanding the raster image data indicated by the rendering information at a first conversion ratio, the first conversion ratio being a conversion ratio corresponding to the characteristic information as obtained, the first conversion ratio being a conversion ratio assuming a size of non-expanded raster image data as one, the non-expanded raster image data being the raster image data generated in the raster image data generating process when using the rendering information without including the expansion rendering instruction information as an input; and inputting, in the operating system, reduced display instruction information, the reduced display instruction information being information instructing the operating system to display an image represented by the raster image data rendered in the rendering area at the first conversion ratio when the operating system executes the display process, and wherein, when the characteristic information indicates that the resolution of the display is the standard resolution, the controller performs:

inputting, in the operating system, non-expansion rendering instruction information to render the non-expanded raster image data; and inputting, in the operating system, display instruction information instructing to display an image represented by the non-expanded raster image data rendered in the rendering area without reducing when the operating system executes the display process.

* * * * *